US012368264B2

(12) United States Patent
Yaremenko

(10) Patent No.: US 12,368,264 B2
(45) Date of Patent: Jul. 22, 2025

(54) CONNECTOR BRACKET FOR A CABLE CONNECTOR

(71) Applicant: Microsoft Technology Licensing, LLC, Redmond, WA (US)

(72) Inventor: Denys V. Yaremenko, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 443 days.

(21) Appl. No.: 17/998,189

(22) PCT Filed: May 4, 2021

(86) PCT No.: PCT/US2021/030722
§ 371 (c)(1),
(2) Date: Nov. 8, 2022

(87) PCT Pub. No.: WO2021/231137
PCT Pub. Date: Nov. 18, 2021

(65) Prior Publication Data

US 2023/0261416 A1 Aug. 17, 2023

(30) Foreign Application Priority Data

May 12, 2020 (NL) ...................................... 2025563

(51) Int. Cl.
*H01R 13/58* (2006.01)
*H01R 12/75* (2011.01)

(52) U.S. Cl.
CPC ......... *H01R 13/5812* (2013.01); *H01R 12/75* (2013.01)

(58) Field of Classification Search
CPC ............ H01R 13/5812; H01R 13/5808; H01R 13/5804; H01R 13/58; H01R 13/5916; H01R 13/582; H01R 13/5825
(Continued)

(56) References Cited

U.S. PATENT DOCUMENTS 4,381,880 A 5/1983 Pohl
4,533,202 A 8/1985 Pohl
(Continued)

FOREIGN PATENT DOCUMENTS

BE 401890 A 4/1934
DE 19820380 C1 4/2000
(Continued)

OTHER PUBLICATIONS

"Search Report and Written Opinion Issued in Netherlands Patent Application NL2025563", Mailed Date: Feb. 22, 2021, 14 Pages.
(Continued)

*Primary Examiner* — Harshad C Patel
(74) *Attorney, Agent, or Firm* — Alleman Hall & Tuttle LLP

(57) ABSTRACT

Examples are disclosed that relate to connector brackets, electronic devices, and methods for securing one or more cables to an electronic device. In one example, a connector bracket configured to stabilize a cable connector comprises a body configured to operatively extend over a first portion of the cable connector. The cable connector also comprises a harness configured to operatively engage a second portion of the cable connector and a biasing member linking the body to the harness. The biasing member is configured to operatively bias the harness against the second portion of the cable connector.

20 Claims, 6 Drawing Sheets

(58) Field of Classification Search
USPC .......................................................... 439/447
See application file for complete search history.

(56) References Cited

U.S. PATENT DOCUMENTS

| | | | | |
|---|---|---|---|---|
| 5,181,854 | A | 1/1993 | Masuda | |
| 6,247,963 | B1 * | 6/2001 | Rattner | A61B 90/00 439/502 |
| 6,340,306 | B1 * | 1/2002 | Daoud | H01R 13/6273 439/219 |
| 6,589,066 | B1 | 7/2003 | Wu | |
| 6,695,621 | B1 * | 2/2004 | Wang | H01R 13/447 439/35 |
| 6,921,281 | B2 * | 7/2005 | Chen | H01R 13/5825 439/906 |
| 7,088,577 | B2 * | 8/2006 | Lauffer | H02G 11/00 361/679.21 |
| 7,234,958 | B1 * | 6/2007 | Copus | H01R 12/7076 439/371 |
| 7,331,829 | B2 * | 2/2008 | Jayne | H04Q 1/023 439/713 |
| 7,387,537 | B1 * | 6/2008 | Daily | H01R 13/6272 439/282 |
| 7,500,867 | B1 * | 3/2009 | Doglio | H01R 13/5841 439/456 |
| 7,744,398 | B1 | 6/2010 | Wilkolaski et al. | |
| 7,946,883 | B2 * | 5/2011 | Hayes | H01R 25/16 439/502 |
| 8,002,565 | B2 * | 8/2011 | Bogart | H01R 13/5205 439/447 |
| 8,647,142 | B1 * | 2/2014 | Kershaw | H01R 13/639 439/373 |
| 9,124,038 | B2 * | 9/2015 | Yu | H01R 13/6582 |
| 9,742,107 | B2 | 8/2017 | Choi et al. | |
| 10,020,614 | B1 * | 7/2018 | Bucher | H01R 13/6275 |
| 10,873,157 | B1 * | 12/2020 | Costello | H01R 13/6272 |
| 12,176,647 | B2 * | 12/2024 | Wrede | H01R 13/4361 |
| 2009/0221176 | A1 * | 9/2009 | Gattwinkel | H01R 13/59 439/447 |
| 2010/0081309 | A1 | 4/2010 | Voli et al. | |
| 2012/0264328 | A1 * | 10/2012 | Wu | H01R 25/003 439/502 |
| 2012/0302090 | A1 * | 11/2012 | Kashiyama | H01R 13/5216 439/447 |
| 2015/0180164 | A1 * | 6/2015 | Lee | H01R 13/562 439/447 |
| 2015/0378116 | A1 | 12/2015 | Zbinden et al. | |

FOREIGN PATENT DOCUMENTS

| | | | |
|---|---|---|---|
| EP | 0077432 | A1 | 4/1983 |
| JP | 2005347079 | A | 12/2005 |
| JP | 2015185292 | A | 10/2015 |

OTHER PUBLICATIONS

"International Search Report and Written Opinion Issued in PCT Application No. PCT/US21/030722", Mailed Date : Aug. 12, 2021, 12 Pages.

* cited by examiner

CONNECTOR BRACKET FOR A CABLE CONNECTOR

CROSS REFERENCE TO RELATED APPLICATIONS

The present application is a U.S. National Phase of International Patent Application Serial No. PCT/US2021/030722 entitled "CONNECTOR BRACKET FOR A CABLE CONNECTOR", filed May 4, 2021, which claims priority to Netherlands Patent Application Serial No. 2025563, filed May 12, 2020, the entire contents of each of which are hereby incorporated by reference for all purposes.

BACKGROUND

Many electronic devices include cables configured to transmit power and/or signals between electronic components. One or more of the cables may include a releasable connector configured to join the cable(s) to a device. However, some connectors used to join a cable to a device may be sensitive to vibration. In these examples, the cable can become disconnected from the device when subjected to vibration.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to connector brackets, electronic devices, and methods for securing one or more cables to an electronic device. In one example, a connector bracket configured to stabilize a cable connector comprises a body configured to operatively extend over a first portion of the cable connector. The cable connector also comprises a harness configured to operatively engage a second portion of the cable connector and one or more biasing members linking the body to the harness. The one or more biasing members are configured to operatively bias the harness against the second portion of the cable connector.

Another example provides a method for securing one or more cables to an electronic device. The method comprises providing a connector bracket. The connector bracket comprises a body configured to operatively extend over a first portion of a cable connector affixed to the one or more cables. The cable connector also comprises a harness configured to operatively engage a second portion of the cable connector and one or more biasing members linking the body to the harness. The one or more biasing members are configured to operatively bias the harness against the second portion of the cable connector. The method further comprises engaging the cable connector with a device connector of the electronic device. The harness is displaced away from the body of the connector bracket in a positive Z-direction, and the connector bracket is affixed to the electronic device. The harness is then released to engage the second portion of the cable connector and bias the harness toward the body in a negative Z-direction.

Another example provides an electronic device comprising a circuit board. A device connector is electronically coupled to the circuit board. A cable connector is releasably coupled to the device connector. A connector bracket is affixed to the electronic device. The connector bracket comprises a body extending over a first portion of the cable connector. The connector bracket also comprises a harness engaging a second portion of the cable connector and one or more biasing members linking the body to the harness. The one or more biasing members bias the harness against the second portion of the cable connector.

DETAILED DESCRIPTION

Many electronic devices include cables configured to transmit power and/or signals between electronic components. One or more of the cables may include a releasable connector that releasably joins the cable(s) to a device. However, some connectors used to join a cable to a device may be sensitive to vibration. For example, a cable connector that inserts into a device connector on a circuit board may be relatively heavy and/or bulky as compared to the device connector. In other examples, a sharp bend in the cable can place a lateral static load on the connector. In these examples, the cable can become disconnected from the device when subjected to vibration.

Figure 1:
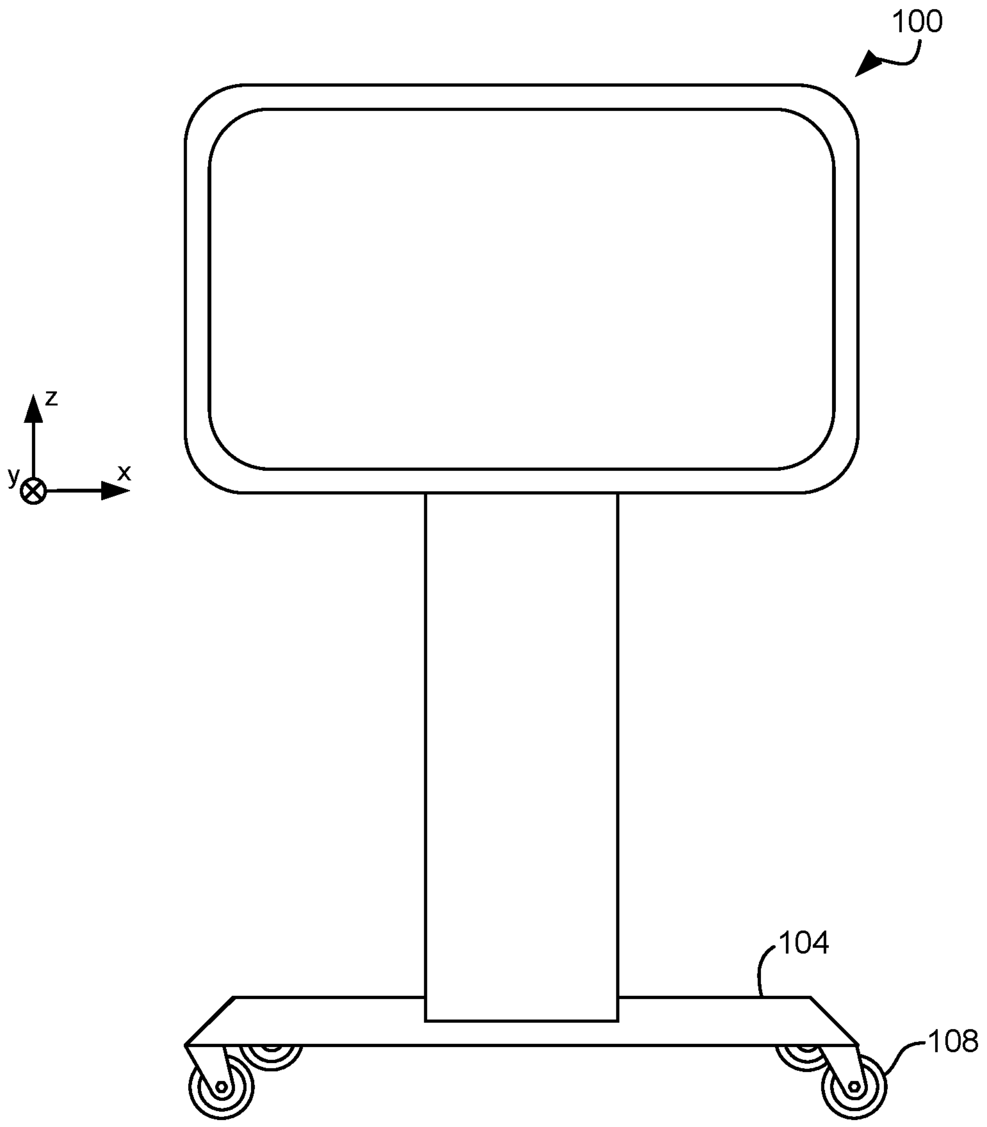
FIG. 1 shows one example of an electronic device in the form of an electronic whiteboard.

Portable or mobile devices may be especially prone to vibrations. FIG. 1 shows one example of a portable device in the form of an electronic whiteboard 100. The electronic whiteboard 100 is mounted on a rolling cart 104. The rolling cart 104 includes casters 108, which may be used to move the electronic whiteboard 100 between different locations. If the rolling cart 104 is rolled across rough surfaces, such as tiles, the electronic whiteboard 100 may be subjected to large amounts of vibration.

As described above, the electronic whiteboard 100 may include one or more internal cables. For example, as described in more detail below, one or more internal cables may be configured to transmit signals between a video board and a display or other internal component. As described above, a connection between the one or more internal cables and an electronic component (e.g. the video board) may be sensitive to vibrations, and the connection may be susceptible to being broken.

In some examples, a connection may be stabilized by using a bail latch to secure the cable connector to the device connector. The bail latch may take the form of a wire that extends over the cable connector and snaps onto the device connector, or vice versa. However, in some examples, the device connector is at least partially covered by one or more other components of the device, such as a housing or an electromagnetic interference (EMI) shield. In these examples, it may be difficult to provide clearances for the bail latch without compromising the one or more other components. Additionally, a bail latch is a static retention feature. Thus, when the cable connector and bail latch becomes dislodged or unseated, the bail latch does not provide a positive "re-seating" force to bias the cable connector back into engagement with the device connector.

In other examples, other types of retention features may be used to secure the connectors to each other. As one example, the cable connector may include a spring-loaded snap configured to engage with an interlocking feature on the device connector when the cable connector and the device connector are engaged. However, and like the bail latch, one or more other components of the device may interfere with operation of the spring-loaded snap. For example, it may be difficult to visually inspect and determine whether the spring-loaded snap is fully engaged when an EMI shield is present. Furthermore, as described above, portable or mobile devices may be especially prone to vibrations. In some examples, large or sustained vibrations may work connectors free of a spring-loaded snap. In these examples and like the bail latch, a spring-loaded snap does not provide a positive "re-seating" force to bias the cable connector back into engagement with the device connector.

Figure 2:
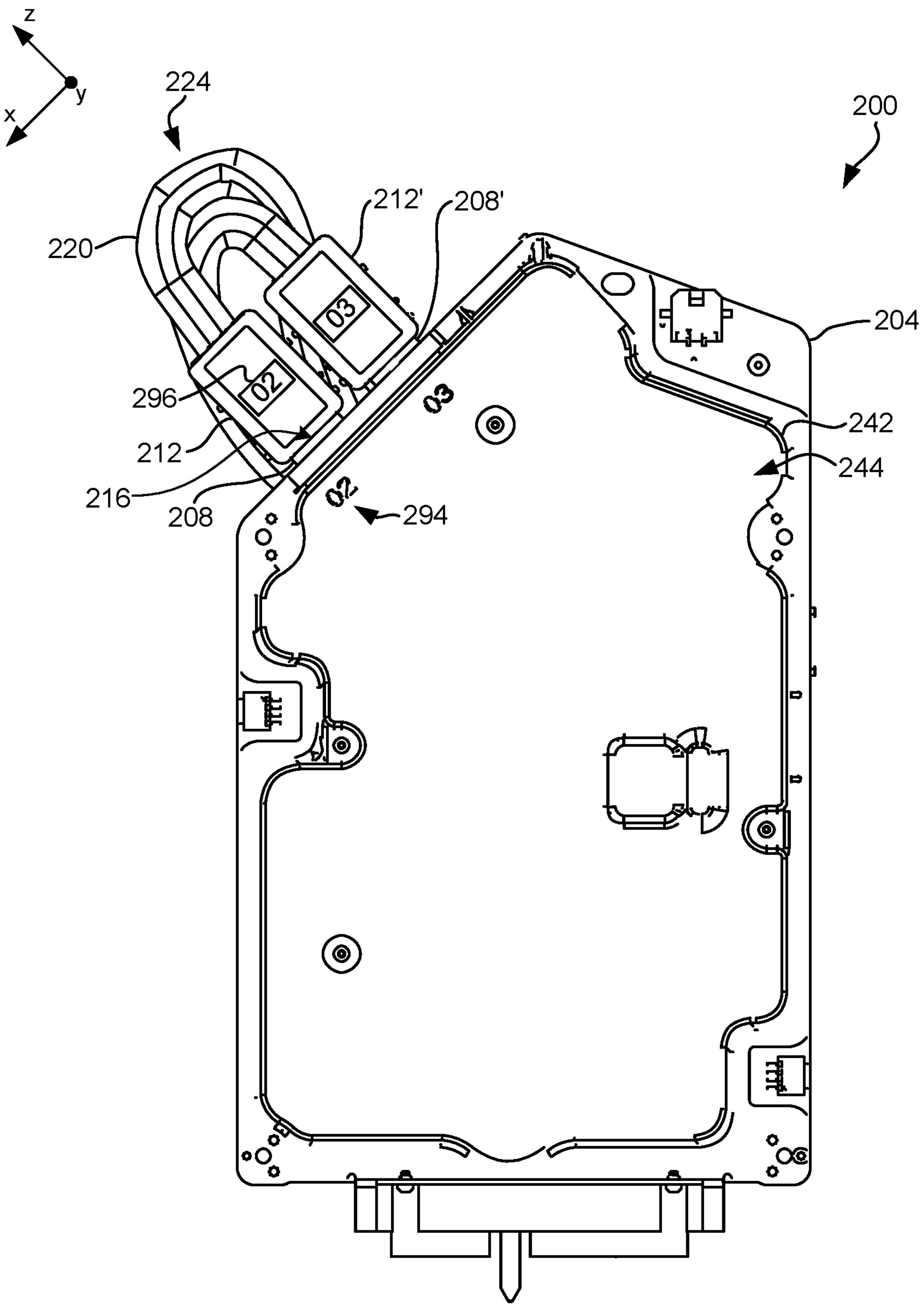
FIG. 2 shows one example of an electronic device including a device connector electronically coupled to a circuit board and a cable connector releasably coupled to the device connector.

FIG. 2 provides one example of an electronic device that comprises a video board assembly 200. In some examples, the video board assembly 200 is a component of another electronic device, such as the electronic whiteboard 100 of FIG. 1. In the example of FIG. 2, the video board assembly 200 is illustrated as viewed from the positive Y-axis towards the negative Y-axis.

As illustrated by example in FIG. 2, the video board assembly 200 includes a circuit board 204 and a first device connector 208 electronically coupled to the circuit board 204. In some examples, the first device connector 208 comprises an I/O connector, such as a NANO-PITCH™ connector provided by MOLEX, LLC of LISLE, ILLINOIS. It will also be appreciated that the first device connector 208 may comprise any other suitable connector for electronically coupling the circuit board 204 to another component, device, etc. The first device connector 208 may be coupled to the circuit board 204 in any suitable manner, such as via a soldered connection.

The video board assembly 200 also includes a first cable connector 212. The first cable connector 212 is releasably coupled to the first device connector 208. In the example of FIG. 2, the first device connector 208 is a female connector, and the first cable connector 212 is a male connector. In other examples, the first device connector 208 is a male connector and the first cable connector 212 is a female connector. It will also be appreciated that the first device connector 208 and the first cable connector 212 may be configured in any other suitable manner using any suitable mode of connection.

In the example of FIG. 2, the video board assembly 200 also includes a second cable connector 212' laterally spaced from the first cable connector 212, and a corresponding second device connector 208'. In other examples, the video board assembly 200 may include one, three or any suitable number of cable connectors and corresponding device connectors. For purposes of the present disclosure, the following descriptions of first cable connector 212 and its relationship to the example connector bracket described below apply equally to the second cable connector 212'.

In the example of FIG. 2, the first cable connector 212 is longer along its longitudinal Z-axis than the first device connector 208. Likewise, an engagement region 216, in which the first device connector 208 and the first cable connector 212 overlap along the Z-axis, is very small relative to the length of the first cable connector. Accordingly, in the presence of large and/or sustained vibrations, the first cable connector 212 may be partially or completely dislodged from its connection with the first device connector 208.

In the example of FIG. 2, the first cable connector 212 is also attached to several cables 220 that are sharply bent at 224. Because of this sharp bend, the cables 220 exert a lateral force on the first cable connector 212 and apply a torque to the first cable connector 212 about the Y-axis. Such torque can strain the connection between the first cable connector 212 and the first device connector 208, as well as the electrical coupling between the first device connector 208 and the circuit board 204. In some use cases and environments, the torque may disengage the first cable connector 212 from the first device connector 208, particularly when vibration is encountered. Additionally, retention features such as the spring-loaded snap and the bail latch discussed above are typically configured to stabilize the first cable connector 212 primarily in the Z-direction. As a result, cable connectors that utilize these conventional retention features may remain vulnerable to lateral forces with components along the X- and/or Y-axes.

Accordingly, examples are disclosed that relate to connector brackets, electronic devices, and methods for securing one or more cables to an electronic device that address one or more of the above issues. As described in more detail below, in some examples, a connector bracket configured to stabilize a cable connector comprises a body configured to operatively extend over a first portion of the cable connector. The cable connector also comprises a harness configured to operatively engage a second portion of the cable connector and one or more biasing members linking the body to the harness. The one or more biasing members are configured to operatively bias the harness against the second portion of the cable connector.

As described in more detail below, such connector brackets may stabilize the cable connector in the X-, Y-, and Z-directions, thereby reducing potential stresses on the device connector, the device connector and the circuit board, and protecting the cable connector from unintended disengagement from the device connector. In addition, the one or more biasing members provide a positive engagement force that biases the cable connector towards engagement with the device connector. Furthermore, the connector bracket may be easily installed in an electronic device, and easy to visually inspect for correct installation and proper seating.

Figure 3:
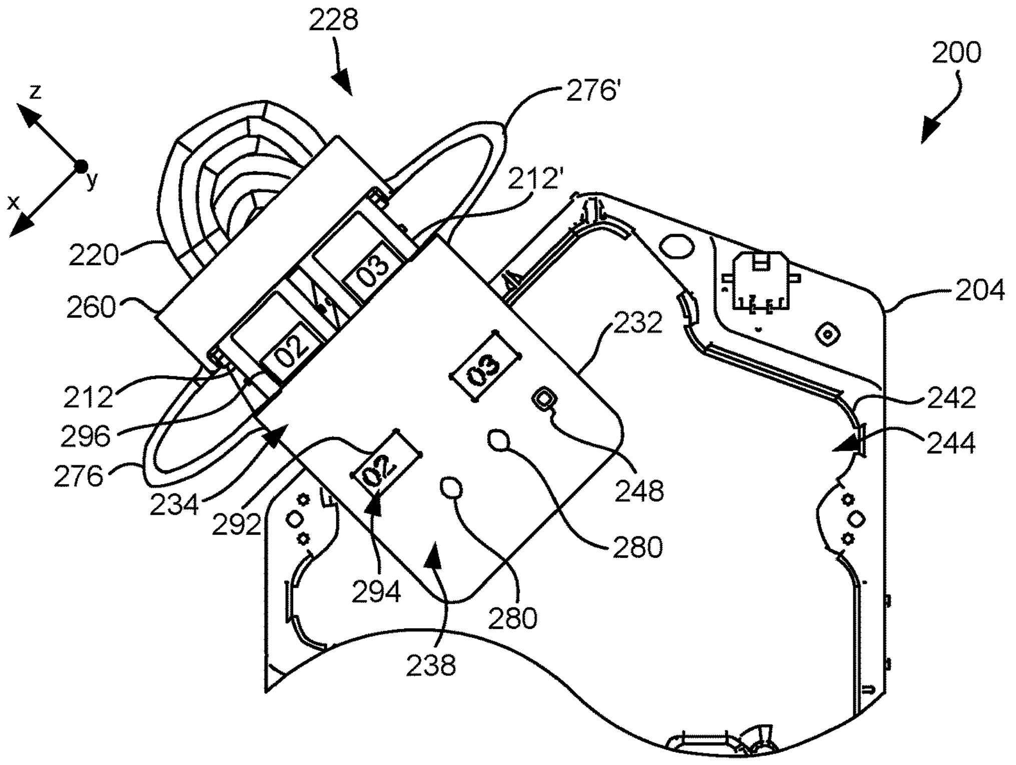
FIG. 3 is an illustrative example of the electronic device of FIG. 2 including a connector bracket configured to stabilize the cable connector according to examples of the present disclosure.
Figure 4:
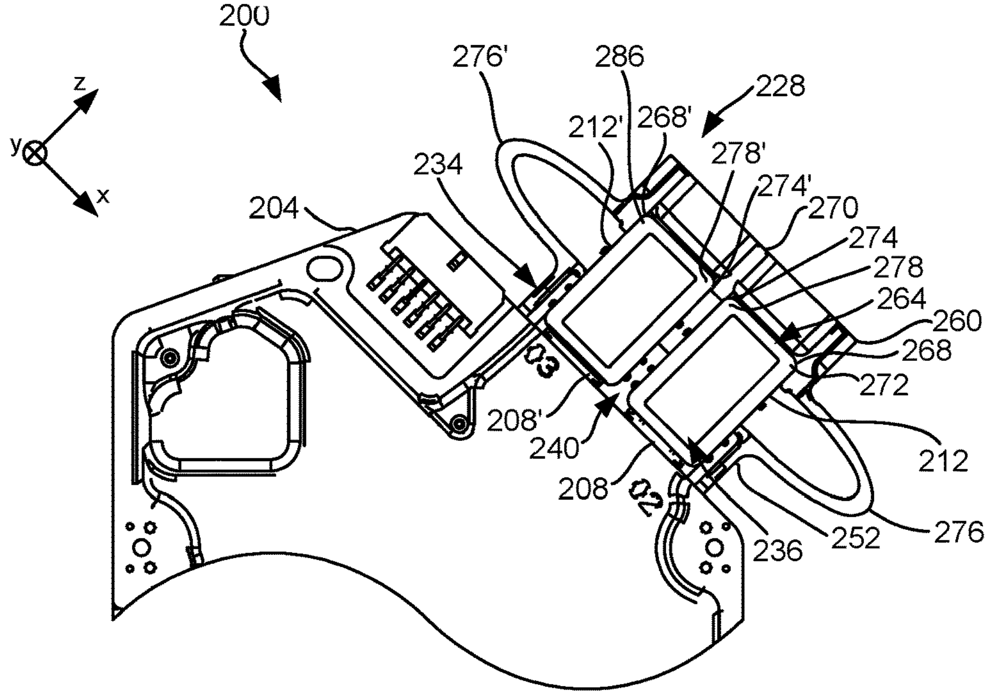
FIG. 4 shows another view of the electronic device and connector bracket of FIG. 3.

FIGS. 3 and 4 show one example of a connector bracket 228 embodying aspects of the present disclosure. In FIGS. 3 and 4, the connector bracket 228 is installed in the video board assembly 200 of FIG. 2. FIG. 3 shows a top-down view of a portion of the video board assembly 200 including the connector bracket 228, as viewed from the positive Y-axis looking towards the negative Y-axis. The Y-axis is perpendicular to the longitudinal Z-axis of the first cable connector 212. FIG. 4 shows a bottom-up view of a portion of the video board assembly 200 including the connector bracket 228, as viewed from the negative Y-axis looking towards the positive Y-axis. In FIG. 4. the cables 220 are not shown for simplicity.

Figure 5:
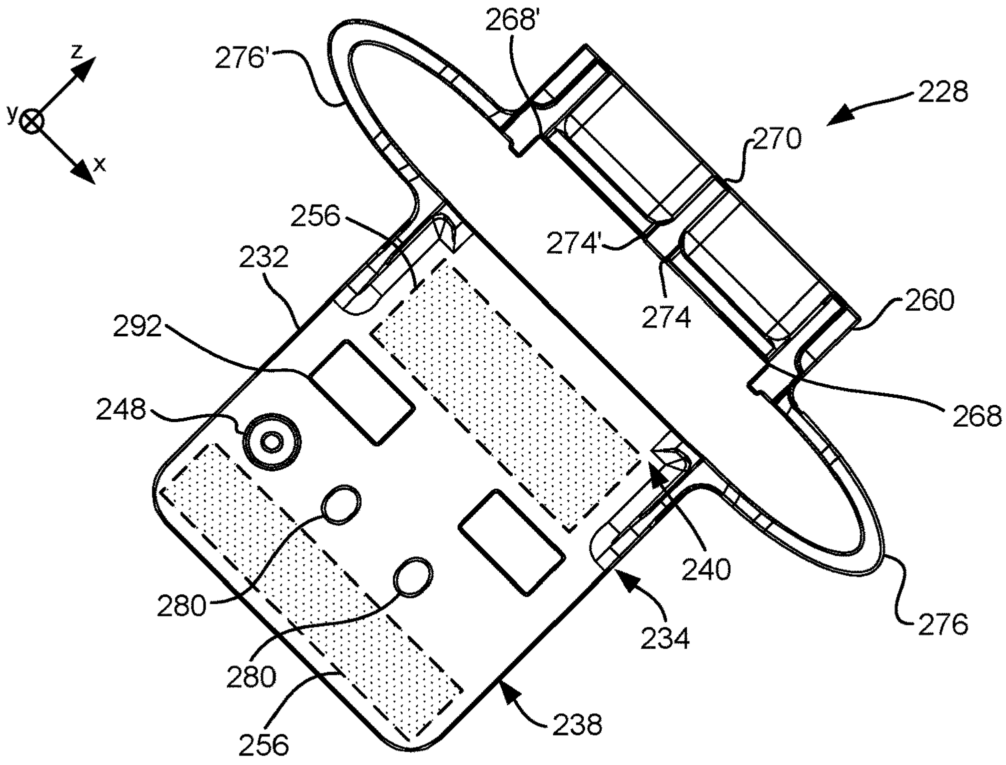
FIG. 5 shows a bottom-up view of the connector bracket of FIGS. 3-4.

As illustrated in FIGS. 3-6, the connector bracket 228 comprises a body 232 including an end portion 234 that extends over a first portion 236 of the first cable connector 212, and a base portion 238 that is configured to be affixed to the video board assembly 200. In the instant example, the first cable connector 212 is a rectangular connector that includes a substantially flat surface in the X-Z plane. With reference to FIGS. 4 and 5, the end portion 234 of the body 232 of connector bracket 228 includes a connector support surface 240 that is also substantially planar and parallel to the X-Z plane. In some example, the connector support surface 240 is configured to directly contact the first cable connector 212 when the connector bracket 228 is installed. In other examples, a tolerance or a gap is disposed between the first cable connector 212 and the connector support surface 240 in the Y-axis direction.

With reference again to FIG. 3, the connector bracket 228 may be affixed to a surface of the video board assembly 200 such that the connector support surface 240 and the base portion 238 are parallel to the surface. As illustrated in the example of FIG. 3, the video board assembly 200 includes an EMI shield 242. The EMI shield 242 comprises an outer surface 244 that is substantially planar and parallel to the X-Z plane. Accordingly, the connector bracket 228 may be affixed to the outer surface 244 of the EMI shield 242 such that the planar base portion 238 rests against the outer surface.

In other examples, the connector bracket 228 may be affixed to any suitable portion of the video board assembly 200, or to another device or component. The connector bracket 228 may be affixed to the video board assembly 200 in any suitable manner, such as via a fastener or an adhesive. In some examples, the base portion 238 of the connector bracket 228 comprises one or more openings 248 configured to accommodate a fastener. In the present example, opening 248 is configured to receive a screw or similar type of fastener that affixes the body 232 to the EMI shield 242 of the video board assembly 200. Any other suitable type of fastener may be used to affix the body 232 to the video board assembly 200, such as a bolt, pin, or snap.

In some examples, and with reference now to FIG. 5, the connector bracket 228 is configured to be affixed to the video board assembly 200 or other device via an adhesive 256. FIG. 5 shows a bottom-up view of the connector bracket 228 as viewed from the negative Y-axis looking towards the positive Y-axis. In the example of FIG. 5, the adhesive 256 is applied to portions of the connector support surface 240 and the base portion 238. The adhesive 256 may comprise any suitable material, such as a pressure-sensitive adhesive (PSA) film. In this manner, when the connector bracket 228 is installed as shown in FIG. 3, with the connector support surface 240 in contact with the EMI shield 242, the adhesive 256 will affix the connector bracket 228 to the video board assembly 200.

With reference to FIG. 4, in this example the adhesive 256 is also positioned to affix the connector support surface 240 of the connector bracket 228 to the first cable connector 212 and second cable connector 212'. It will also be appreciated that the adhesive 256 may be used alone or in combination with one or more fasteners as disclosed above to affix the connector bracket 228 to the video board assembly 200. For example, one or more portions of adhesive may be utilized in combination with one or more fasteners to provide a stronger connection between the connector bracket 228 and the video board assembly 200 as compared to using fastener (s) alone. In some examples, adhesive may be utilized in locations of the connector bracket that are unsuitable for fasteners. In some examples, adhesive alone may be utilized to bond the connector bracket 228 to the video board assembly 200, which can avoid introducing holes in the connector bracket and video board assembly that otherwise would be required by certain fasteners. In some examples, targeted locations of adhesive may utilize less overall surface area that fasteners. In other examples, connector brackets of the present disclosure may not utilize adhesives in this manner.

With reference again to FIGS. 3 and 4, the connector bracket 228 further comprises a harness 260 configured to engage a second portion 264 of the first cable connector 212. As illustrated by example in FIG. 4, the second portion 264 of the first cable connector 212 is at an opposite end of the connector from the first portion 236 of the connector, and is spaced from the first device connector 208 along the longitudinal Z-axis of the first cable connector. The first portion 236 of the first cable connector 212 is proximal to the first device connector 208 along the Z-axis.

Figure 6:
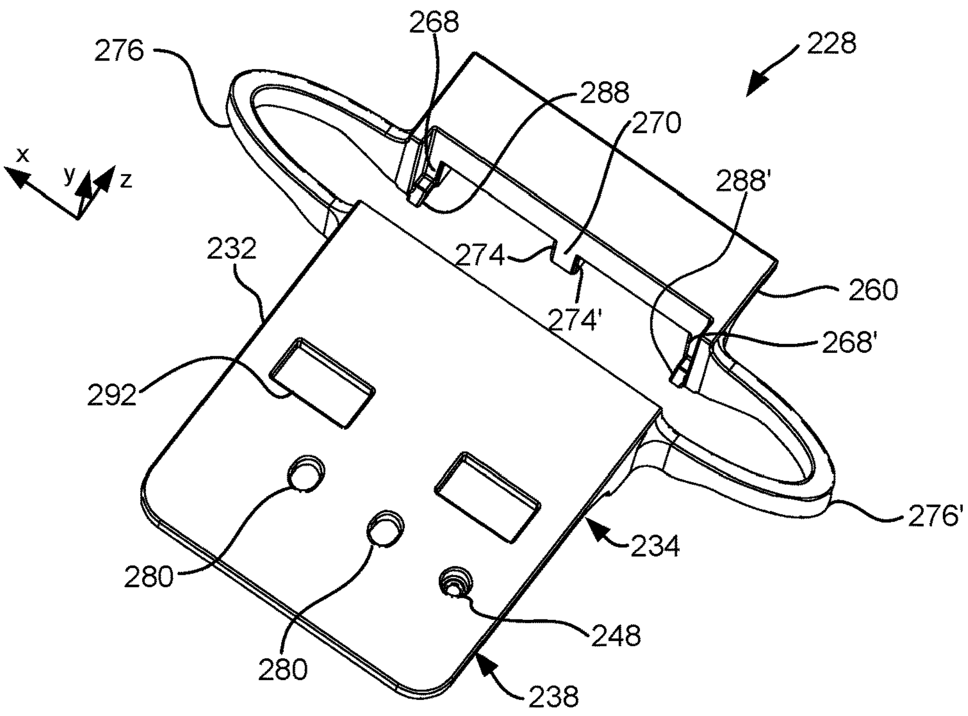
FIG. 6 shows a top-down perspective view of the connector bracket of FIGS. 3-4.

As illustrated by example in FIG. 6, the harness 260 comprises a plurality of structures configured to cradle the second portion 264 of the first cable connector 212. FIG. 6 is a top-down three-dimensional perspective illustration of the connector bracket 228. As shown in the example of FIGS. 5 and 6, the harness 260 comprises a first engagement surface in the form of a first radiused portion 268.

With reference also to FIG. 4, the first radiused portion 268 engages a corner 272 of the second portion 264 of the first cable connector 212. As shown in FIG. 4, the first radiused portion 268 captures a corresponding radius in the corner 272 of the first cable connector 212. In other examples, the first radiused portion 268 may comprise a right-angle corner in the harness 260. In this manner, the first radiused portion 268 is configured to capture the corner 272 of the first cable connector 212 and resist movement of the connector in the X- and Y-directions. Additionally and as described in more detail below, biasing members of the connector bracket 228 are configured to urge the first radiused portion 268 into the corner 272 of the first cable connector 212 and deliver a re-seating force in the negative Z-direction to stabilize the connection between the first cable connector 212 and the first device connector 208.

In some examples, a spacer material, such as foam, may be utilized in at least a portion of the harness 260 that engages the first cable connector 212. For example, one or more pieces of foam may be applied to the first radiused portion 268 such that the foam is positioned between the first radiused portion 268 and the corner 272 of the first cable connector 212. When compressed, the foam deforms to provide a more resilient connection and greater contact surface area between the harness 260 and the first cable connector 212, which may further stabilize the first cable connector 212.

As described above, in some examples a connector bracket of the present disclosure is configured to extend over two or more cable connectors. In the example of FIGS. 3 and 4, the connector bracket 228 extends over the first cable connector 212 and the second cable connector 212'. In this example, the harness 260 comprises a second engagement surface in the form of a second radiused portion 268'. The second radiused portion 268' is positioned on the opposite side of the connector bracket 228 from the first radiused portion 268. Like the first radiused portion 268, the second radiused portion 268' is configured to capture a corner 286 of the second cable connector 212' to resist movement of this connector in the X- and Y-directions and provide a re-seating force in the negative Z-direction.

As best seen in FIGS. 4-6, in some examples the harness 260 further comprises a rib 270 positioned between the first radiused portion 268 and the second radiused portion 268'. The rib 270 is configured to engage the first cable connector 212 and the second cable connector 212'. As best shown in FIG. 6, the rib 270 comprises a first edge 274 and a second edge 274'. With reference to FIG. 4, the first edge 274 is configured to engage an inner corner 278 of the first cable connector 212, and the second edge 274' is configured to engage an inner corner 278' of the second cable connector 212'. In this manner, the rib 270 cooperates with the first radiused portion 268 and second radiused portion 268' to capture the first cable connector 212 and the second cable connector 212', respectively, and thereby further stabilize the cable connectors.

To bias the harness 260 toward the first cable connector 212 and the second cable connector 212' and create the re-seating force discussed above, the connector bracket 228 further comprises a biasing member, such as a spring, that links the body 232 to the harness. The biasing member may comprise any suitable material, such as plastic, spring steel, or elastomeric material, and may comprise a single component or two or more components.

The biasing member may have any suitable structure. In the example of FIGS. 3-8, the biasing member comprises two U-shaped springs 276 and 276' positioned on opposing sides of the connector bracket 228. Each of the two U-shaped springs 276, 276' is positioned at a distal edge of the connector bracket 228 with respect to the X-axis. In other examples, the biasing member may comprise one or more coiled springs, leaf springs, or other spring configurations.

In some examples, the body 232, the harness 260, and the U-shaped springs 276, 276' of the connector bracket 228 comprise the same material. In the example illustrated in FIGS. 3-8, the connector bracket 282 comprises a unibody structure in which the body 232, harness 260, and U-shaped springs 276, 276' form a single unitary structure. The unibody structure may be formed from any suitable material, such as plastic or steel. In this manner, the connector bracket 282 may be relatively inexpensive, simple, and easy to mass produce.

In other examples, the body 232, the harness 260, and the U-shaped springs 276, 276' may comprise separate and distinct physical components that are assembled to form the connector bracket 228. For example, the U-shaped springs 276, 276' may be configured to attach to or insert into the body 232 and the harness 260 to link the body 232 to the harness 260. In these examples, one or more of the body 232, the harness 260, and the U-shaped springs 276, 276' may comprise the same material or different materials.

Figure 8:
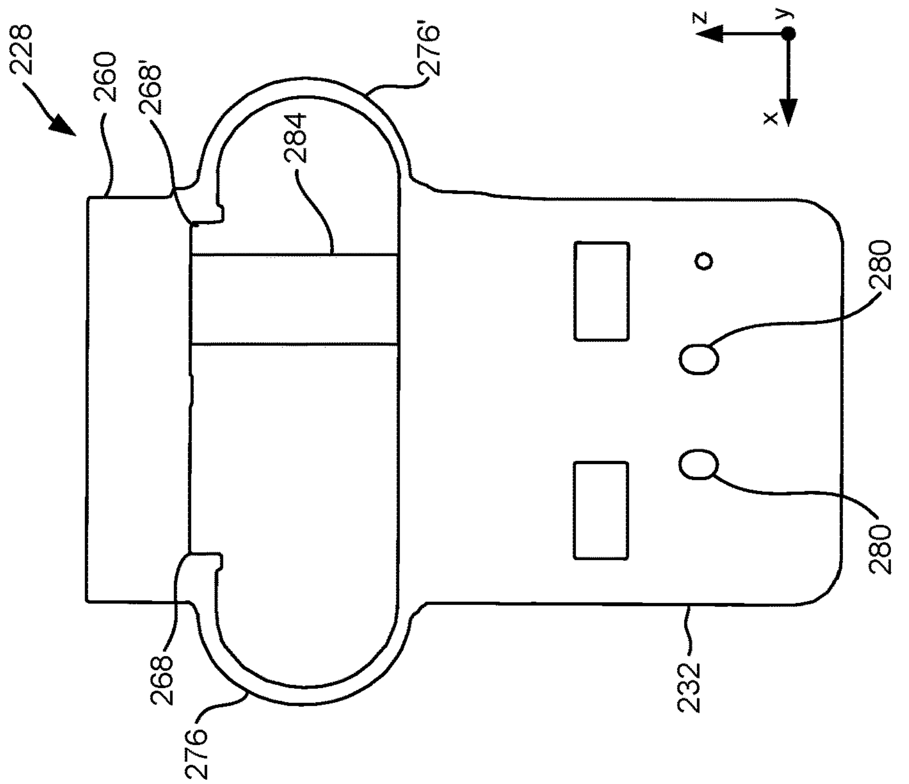
FIG. 8 shows the connector bracket of FIG. 7 with the harness displaced from the body of the bracket using a spreader tool.
Figure 7:
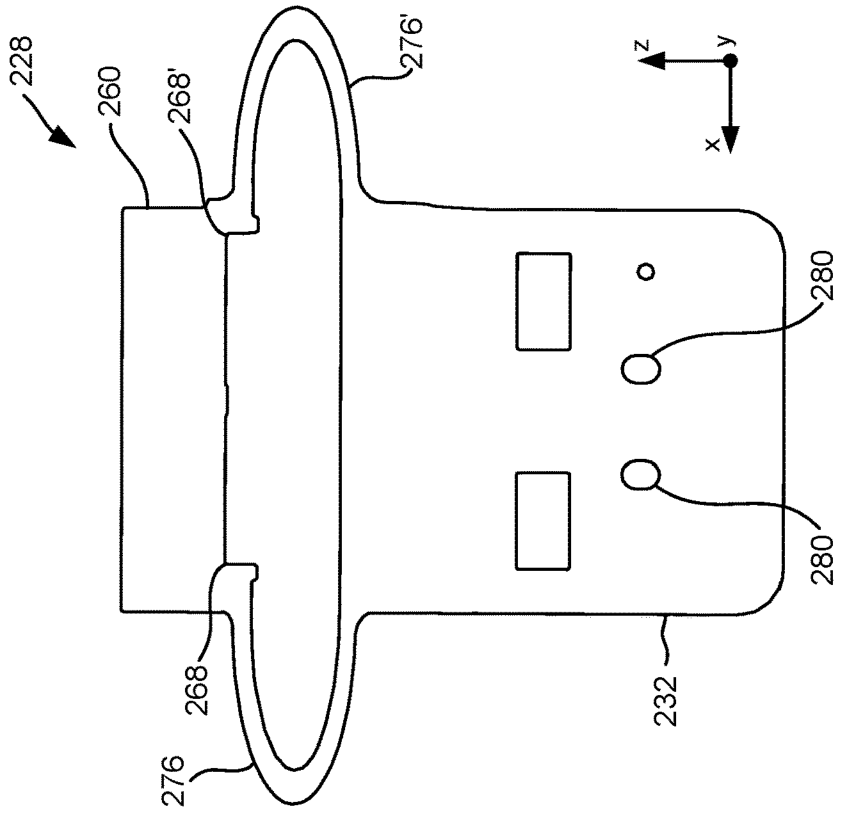
FIG. 7 shows a top-down view of the connector bracket of FIGS. 3-4 according to examples of the present disclosure.

As illustrated by example in FIGS. 7 and 8, each of the U-shaped springs 276, 276' is configured to flex in the X-Z plane when compressed or extended in the Z-direction. In the example of FIG. 7 the connector bracket 228 is shown with the U-shaped springs 276, 276' in a neutral position in which the springs do not exert a spring force on the body 232 and/or the harness 260.

In the example of FIG. 8, the harness 260 is displaced away from the body 232 in the positive Z-axis direction. Correspondingly, the U-shaped springs 276, 276' are extended in the positive Z-axis direction. When the U-shaped springs 276, 276' are extended in the positive Z-axis direction, each of the springs exerts a force on the harness 260 in the negative Z-axis direction, and a force on the body 232 in the positive Z-axis direction. In this manner, the U-shaped springs 276, 276' bias the harness 260 and the body 232 towards one another.

With reference again to FIG. 7 and also FIGS. 3 and 4, in the neutral configuration of FIG. 7 the Z-axis positions of first radiused portion 268 and second radiused portion 268' overlap with the Z-axis positions of corners 272 and 286 of the first and second cable connectors 212 and 212', respectively. Accordingly and as illustrated in FIGS. 3 and 4, when the connector bracket 228 is installed and engaging the first and second cable connectors 212 and 212', the U-shaped springs 276, 276' bias the harness 260 toward the body 232 along the Z-axis to thereby press the first and second radiused portions 268, 268' into corners 272 and 286 of the first and second cable connectors 212, 212', respectively. Additionally, the first and second edges 274, 274' of the rib 270 are similarly urged into contact with the inner corners 278, 278' of the first and second cable connectors 212, 212', respectively.

With reference now to FIG. 6, in some examples the connector bracket 228 comprises one or more tool engagement features to aid in displacing the harness 260 from the body 232. The one or more tool engagement features may have any suitable configuration, such as one or more openings, slots, or holes configured to accommodate at least a portion of a spreader tool used to move the harness 260 away from the body 232. As illustrated by example in FIG. 6, the connector bracket 228 includes two tool engagement features in the form of holes 280 that extend through the body 232 of the connector bracket 228. In some examples, an installation technician may engage a spreader tool (such as reverse pliers) with one or more of the holes 280 to move the harness 260 away from the body 232.

With reference again to FIG. 8, in some examples the harness 260 may be pre-stretched before installation of the connector bracket 228. In this example, a spreader tool in the form of a shim 284 is inserted between the harness 260 and the body 232 to maintain a displacement of the harness from the body while the U-shaped springs 276, 276' exert a return force on the harness. In this manner, the installation technician may simply position and affix the body 232 of the connector bracket 228 to the video board assembly 200, remove the shim 284 to release the harness 260, and guide the harness and its engagement surfaces into contact with the corresponding surfaces of the first and second cable connectors 212, 212' as described above.

In this manner, the spring force provided by the U-shaped springs 276, 276' acts through the harness 260 to urge the first and second cable connectors 212, 212' into connection with the first and second device connectors 208, 208', respectively. Advantageously, in the event of a vibration, shock or other event that may tend to dislodge this connection, the spring force generated by the U-shaped springs 276, 276' provides an engagement or "re-seating" action that biases the first and second cable connectors 212, 212' back into engagement with the first and second device connectors 208, 208'.

With reference again to FIG. 6, in some examples, the connector bracket 228 includes one or more lead-in features configured to align the cable connectors to seat properly in a Y-axis direction when the harness 260 is engaged. In the example of FIG. 6, the connector bracket 228 comprises a lead-in feature in the form of a first ramp 288 adjacent to the first radiused portion 268. A leading edge of the ramp 288 extends in the negative Z-axis direction toward the body 232. In this manner, the ramp 288 is configured to engage the second portion 264 of the first cable connector 212 as the harness 260 is moved into contact with this connector, and to center the connector in the positive Y-axis direction as the harness is moved towards the body 232 in the negative Z-axis direction. This may facilitate easier installation of the connector bracket 228. A similar lead-in feature in the form of a second ramp 288' is located adjacent to the second radiused portion 268', and functions in a similar manner to align the second cable connector 212'.

The connector bracket 228 may include other features configured to aid in assembly. For example, the connector bracket 228 may include one or more apertures configured to provide visibility through at least a portion of the connector bracket. As illustrated by example in FIG. 3, the connector bracket 228 includes an aperture 292 in body 232 configured to provide visibility through a portion of the body. For example, the aperture 292 is positioned on the body 232 to align with a marking 294 on the video board assembly 200 when the connector bracket 228 is affixed to the video board assembly 200. In this manner, the marking 294 may be visible during installation of the connector bracket 228.

The marking 294 may be a number or any other suitable type of indicator. The marking 294 may correspond to an identifier of the first device connector 208. In the example of FIG. 3, the marking 294 is a number "02" which is visible through the aperture 292. In this example, the first cable connector 212 includes a corresponding marking 296 of the number "02." The corresponding marking 296 is visible in the space between the harness 260 and the body 232 of the connector bracket 228. The marking 294 may be compared to the corresponding marking 296 to verify that the correct first cable connector 212 is attached to the first device connector 208.

Figure 9:
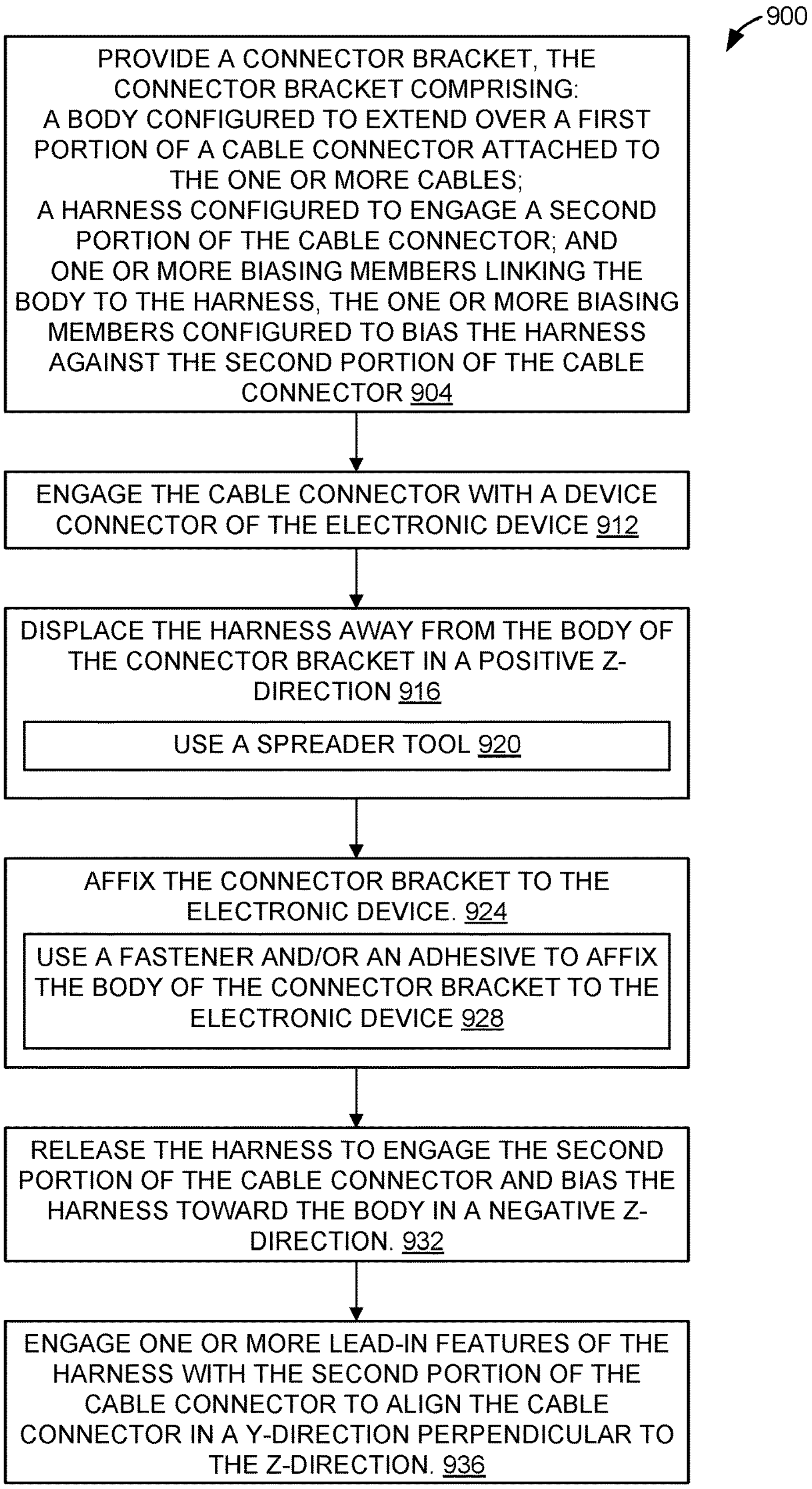
FIG. 9 is a block diagram of an example method for securing one or more cables to an electronic device according to examples of the present disclosure.

With reference now to FIG. 9, a flow diagram is provided depicting an example method 900 for securing one or more cables to an electronic device. The following description of method 900 is provided with reference to the materials and components described herein and shown in FIGS. 1-8. It will be appreciated that method 900 also may be performed in other contexts using other suitable materials and components.

At 904, the method 900 includes providing a connector bracket. The connector bracket comprises a body configured to extend over a first portion of a cable connector attached to the one or more cables and a harness configured to engage a second portion of the cable connector. The connector bracket further comprises one or more biasing members linking the body to the harness. The one or more biasing members are configured to bias the harness against the second portion of the cable connector. In some examples, the connector bracket is provided after routing the one or more cables within a device.

At 912, the method 900 includes engaging the cable connector with a device connector of the electronic device. At 916, the method 900 includes displacing the harness away from the body of the connector bracket in a positive Z-direction. At 920, the method 900 may include using a spreader tool, such as a shim, spreader, or reverse pliers, to displace the harness away from the body of the connector bracket in the positive Z-direction.

At 924, the method 900 includes affixing the connector bracket to the electronic device. At 928, the method 900 may include using a fastener and/or an adhesive to affix the body of the connector bracket to the electronic device. At 932, the method 900 includes releasing the harness to engage the second portion of the cable connector and bias the harness toward the body in a negative Z-direction. In examples where a spreader tool is used to displace the harness from the body of the connector bracket, releasing the harness may include removing the spreader tool. In this manner, the harness may be configured to exert a static load on the cable connector in the negative Z-direction. At 936, the method 900 may include, wherein the harness comprises one or more lead-in features, engaging the one or more lead-in features with the second portion of the cable connector to align the cable connector in a Y-direction perpendicular to the Z-direction.

The following paragraphs provide additional support for the claims of the subject application. One aspect provides a connector bracket configured to stabilize a cable connector, the connector bracket comprising: a body configured to operatively extend over a first portion of the cable connector; a harness configured to operatively engage a second portion of the cable connector; and a biasing member linking the body to the harness, the biasing member configured to operatively bias the harness against the second portion of the cable connector.

The connector bracket may additionally or alternatively include, wherein the body comprises one or more openings configured to accommodate a fastener to affix the body to an electronic device. The connector bracket may additionally or alternatively include an adhesive that operatively affixes the body of the connector bracket to one or more of the first portion of the cable connector and an electronic device. The connector bracket may additionally or alternatively include, wherein the harness comprises an engagement surface configured to operatively engage a corner of the second portion of the cable connector.

The connector bracket may additionally or alternatively include, wherein the cable connector is a first cable connector, and the body is configured to operatively extend over the first cable connector and a second cable connector. The connector bracket may additionally or alternatively include, wherein the harness comprises a first engagement surface configured to operatively engage the first cable connector, and a second engagement surface configured to operatively engage the second cable connector; and wherein the first engagement surface and the second engagement surface are positioned on opposing sides of the connector bracket. The connector bracket may additionally or alternatively include, wherein the harness further comprises a rib positioned between the first engagement surface and the second engagement surface, the rib configured to operatively engage the first cable connector and the second cable connector.

The connector bracket may additionally or alternatively include, wherein the biasing member comprises a spring. The connector bracket may additionally or alternatively include, wherein the connector bracket comprises a unibody structure. The connector bracket may additionally or alternatively include, wherein the biasing member comprises two springs positioned on opposing sides of the connector bracket. The connector bracket may additionally or alternatively include, wherein each of the two springs is a U-shaped spring configured to flex in an X-Z plane when compressed or extended in a Z-direction.

The connector bracket may additionally or alternatively include, wherein the body is spaced from the harness in a Z-direction, and the biasing member is configured to bias the harness against the second portion of the cable connector in the Z-direction. The connector bracket may additionally or alternatively include, wherein the body is spaced from the harness in a Z-direction, and the harness comprises one or more lead-in features configured to engage the second portion of the cable connector to align the cable connector in a Y-direction perpendicular to the Z-direction.

The connector bracket may additionally or alternatively include one or more tool engagement features. The connector bracket may additionally or alternatively include, wherein the body defines one or more apertures configured to provide visibility through at least a portion of the connector bracket.

Another aspect provides a method for securing one or more cables to an electronic device, the method comprising: providing a connector bracket, the connector bracket comprising: a body configured to operatively extend over a first portion of a cable connector attached to the one or more cables; a harness configured to operatively engage a second portion of the cable connector; and a biasing member linking the body to the harness, the biasing member configured to operatively bias the harness against the second portion of the cable connector; engaging the cable connector with a device connector of the electronic device; displacing the harness away from the body of the connector bracket in a positive Z-direction; affixing the connector bracket to the electronic device; and releasing the harness to engage the second portion of the cable connector and bias the harness toward the body in a negative Z-direction.

The method may additionally or alternatively include, wherein affixing the connector bracket to the electronic device comprises using a fastener and/or an adhesive to affix the body of the connector bracket to the electronic device. The method may additionally or alternatively include, wherein the harness comprises one or more lead-in features, the method further comprising engaging the one or more lead-in features with the second portion of the cable connector to align the cable connector in a Y-direction perpendicular to the Z-direction. The method may additionally or alternatively include, wherein displacing the harness away from the body of the connector bracket comprises using a spreader tool to displace the harness away from the body of the connector bracket in the positive Z-direction.

Another aspect provides an electronic device comprising: a circuit board; a device connector electronically coupled to the circuit board; a cable connector releasably coupled to the device connector; and a connector bracket affixed to the electronic device, the connector bracket comprising: a body extending over a first portion of the cable connector; a harness engaging a second portion of the cable connector; and a biasing member linking the body to the harness, the biasing member biasing the harness against the second portion of the cable connector.

It will be understood that the configurations and/or approaches described herein are exemplary in nature, and that these specific embodiments or examples are not to be considered in a limiting sense, because numerous variations are possible. The specific routines or methods described herein may represent one or more of any number of strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A connector bracket for securing one or more cables to an electronic device, the connector bracket configured to stabilize a cable connector, the connector bracket comprising:

a body configured to operatively extend over a first portion of the cable connector, and the body being configured to be affixed to the electronic device;

a harness configured to operatively engage a second portion of the cable connector; and a biasing member linking the body to the harness, the biasing member comprising a spring configured to operatively bias the harness against the second portion of the cable connector, wherein the body and the harness are arranged spaced apart along a longitudinal axis of the bracket in a direction defined as the z-direction, and the biasing member is configured to bias the harness against the second portion of the cable connector in the Z-direction towards the body of the connector bracket;

wherein the cable connector is a first cable connector, and the body is configured to operatively extend over the first cable connector and a second cable connector;

wherein the harness comprises a first engagement surface configured to operatively engage the first cable connector, and a second engagement surface configured to operatively engage the second cable connector; and wherein the first engagement surface and the second engagement surface are positioned on opposing sides of the connector bracket.

2. The connector bracket of claim 1, wherein the body comprises one or more openings configured to accommodate a fastener to affix the body to an electronic device.

3. The connector bracket of claim 1, the body further comprising an adhesive, wherein the adhesive is configured to affix the body of the connector bracket to the electronic device.

4. The connector bracket of claim 1, wherein the engagement surface is configured to operatively engage a corner of the second portion of the cable connector.

5. The connector bracket of claim 1, wherein the harness further comprises a rib positioned between the first engagement surface and the second engagement surface, the rib configured to operatively engage the first cable connector and the second cable connector.

6. The connector bracket of claim 1, wherein the connector bracket comprises a unibody structure.

7. The connector bracket of claim 1, wherein the biasing member comprises two springs positioned on opposing sides of the connector bracket.

8. The connector bracket of claim 7, wherein each of the two springs is a U-shaped spring configured to flex in an X-Z plane when compressed or extended in the Z-direction, the two springs on opposing sides of the connector bracket being arranged spaced apart along a lateral axis of the bracket in a direction defined as the X-direction.

9. The connector bracket of claim 1, wherein the harness comprises one or more lead-in features configured to engage the second portion of the first cable connector to align the first cable connector in a Y-direction perpendicular to the Z-direction.

10. The connector bracket of claim 1, further comprising one or more tool engagement features.

11. The connector bracket of claim 1, wherein the body defines one or more apertures configured to provide visibility through at least a portion of the connector bracket.

12. A method for securing one or more cables to an electronic device, the method comprising:

providing a connector bracket comprising:

a body configured to operatively extend over a first portion of a cable connector attached to the one or more cables, and the body being configured to be affixed to the electronic device;

a harness configured to operatively engage a second portion of the cable connector; and a biasing member linking the body to the harness, the biasing member comprising a spring configured to operatively bias the harness against the second portion of the cable connector, wherein the body and the harness are arranged spaced apart along a longitudinal axis of the bracket in a direction defined as the Z-direction, and the biasing member is configured to bias the harness against the second portion of the cable connector in the Z-direction towards the body of the connector bracket;

wherein the cable connector is a first cable connector, and the body is configured to operatively extend over the first cable connector and a second cable connector;

wherein the harness comprises a first engagement surface configured to operatively engage the first cable connector, and a second engagement surface configured to operatively engage the second cable connector; and wherein the first engagement surface and the second engagement surface are positioned on opposing sides of the connector bracket;

engaging the first cable connector with a first device connector of the electronic device;

displacing the harness away from the body of the connector bracket in a positive Z-direction;

affixing the connector bracket to the electronic device; and releasing the harness to engage the second portion of the first cable connector and bias the harness toward the body in a negative Z-direction.

13. The method of claim 12, wherein affixing the connector bracket to the electronic device comprises using a fastener and/or an adhesive to affix the body of the connector bracket to the electronic device.

14. The method of claim 12, wherein the harness comprises one or more lead-in features, the method further comprising engaging the one or more lead-in features with the second portion of the first cable connector to align the first cable connector in a Y-direction perpendicular to the Z-direction.

15. The method of claim 12, wherein displacing the harness away from the body of the connector bracket comprises using a spreader tool to displace the harness away from the body of the connector bracket in the positive Z-direction.

16. An electronic device comprising:

a circuit board;

a device connector electronically coupled to the circuit board;

a cable connector releasably coupled to the device connector; and a connector bracket affixed to the electronic device, the connector bracket comprising:

a body extending over a first portion of the cable connector and affixed to the electronic device;

a harness engaging a second portion of the cable connector; and a biasing member linking the body to the harness, the biasing member comprising a spring biasing the harness against the second portion of the cable connector, wherein the body and the harness are arranged spaced apart along a longitudinal axis of the bracket in a direction defined as the Z-direction, and the biasing member biases the harness against the second portion of the cable connector in the Z-direction towards the body of the connector bracket, wherein the cable connector is a first cable connector, and the body extends over the first cable connector and a second cable connector, wherein the harness comprises a first engagement surface that engages the first cable connector, and a second engagement surface that engages the second cable connector, and wherein the first engagement surface and the second engagement surface are positioned on opposing sides of the connector bracket.

17. The electronic device of claim 16, wherein the connector bracket comprises a unibody structure.

18. The electronic device of claim 16, wherein the biasing member comprises two springs positioned on opposing sides of the connector bracket.

19. The electronic device of claim 18, wherein each of the two springs comprises a U-shaped spring configured to flex in an X-Z plane when compressed or extended in the Z-direction, the two springs on opposing sides of the connector being arranged spaced apart along a lateral axis of the bracket in a direction defined as the X-direction.

20. The electronic device of claim 16, wherein the connector bracket comprises one or more tool engagement features.

* * * * *